(12) United States Patent  
Tanaka et al.

(10) Patent No.: US 11,443,265 B2  
(45) Date of Patent: Sep. 13, 2022

(54) ANALYSIS SYSTEM AND ANALYSIS METHOD

(71) Applicant: Hitachi, Ltd., Tokyo (JP)

(72) Inventors: Masataka Tanaka, Tokyo (JP); Yoshio Mitsuishi, Tokyo (JP); Fumiya Shimizu, Tokyo (JP); Yuma Shiho, Tokyo (JP); Naoaki Kawashima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 41 days.

(21) Appl. No.: 17/088,627

(22) Filed: Nov. 4, 2020

(65) Prior Publication Data

US 2021/0150640 A1 May 20, 2021

(30) Foreign Application Priority Data

Nov. 14, 2019 (JP) .............................. JP2019-205935

(51) Int. Cl.
*G06Q 10/06* (2012.01)
*G06Q 50/04* (2012.01)

(52) U.S. Cl.
CPC ....... *G06Q 10/06393* (2013.01); *G06Q 50/04* (2013.01)

(58) Field of Classification Search
CPC .......................................... G06Q 10/00–50/00
USPC .............................................. 705/7.11–7.42
See application file for complete search history.

(56) References Cited

U.S. PATENT DOCUMENTS

| | | | | |
|---|---|---|---|---|
| 6,308,107 B1 * | 10/2001 | Conboy | ................. | G06Q 10/08 700/121 |
| 7,380,213 B2 * | 5/2008 | Pokorny | ............ | G05B 13/0285 715/764 |
| 7,623,936 B1 * | 11/2009 | Qu | ......................... | G06Q 10/06 700/121 |
| 8,543,524 B1 * | 9/2013 | Fox | ........................ | G06Q 10/04 703/2 |
| 9,964,967 B2 * | 5/2018 | Zheng | ................ | G05B 23/0237 |
| 2002/0194522 A1 * | 12/2002 | Mishima | ............. | G06F 11/3423 714/1 |
| 2003/0097197 A1 * | 5/2003 | Parent | .................. | G05B 13/042 700/31 |

(Continued)

FOREIGN PATENT DOCUMENTS

JP 2013-162310 A 8/2013

*Primary Examiner* — Alan S Miller  
(74) *Attorney, Agent, or Firm* — Mattingly & Malur, PC

(57) ABSTRACT

A cause of work loss in a factory that produces high-mix low-volume products is extracted. The analysis system includes: a calculation unit; a storage unit; and an input and output unit. The storage unit stores record information related to operation time of an activity for producing a product, and threshold information for determining whether the activity of producing the product is abnormal based on the operation time. The calculation unit is configured to determine the operation time and non-operation time for each case extracted from the record information, determine abnormality for each case based on the operation time for each case and the threshold information, and output information of comparing the operation time of a case determined to be abnormal with the operation time of a case not determined to be abnormal to the input and output unit.

9 Claims, 13 Drawing Sheets

(56) References Cited

U.S. PATENT DOCUMENTS

| | | | |
|---|---|---|---|
| 2005/0288812 A1* | 12/2005 | Cheng | G05B 19/41875 700/109 |
| 2006/0031840 A1* | 2/2006 | Yigit | G06F 9/5088 718/102 |
| 2007/0198135 A1* | 8/2007 | Chang | G05B 19/4184 700/300 |
| 2008/0103715 A1* | 5/2008 | Tsuda | G07C 3/00 702/81 |
| 2008/0228546 A1* | 9/2008 | Yanase | G06Q 10/063 705/7.11 |
| 2010/0228376 A1* | 9/2010 | Stafford | G06Q 10/04 700/110 |
| 2010/0249968 A1* | 9/2010 | Neuber | G06Q 50/04 700/99 |
| 2012/0158279 A1* | 6/2012 | Faivre | E02F 9/26 701/124 |
| 2013/0069792 A1* | 3/2013 | Blevins | G06F 17/16 703/2 |
| 2014/0058801 A1* | 2/2014 | Deodhar | G06Q 10/0639 705/7.38 |
| 2014/0172478 A1* | 6/2014 | Vadasz | G06Q 10/063114 705/7.15 |
| 2015/0277434 A1* | 10/2015 | Ito | G05B 19/4097 700/97 |
| 2016/0171414 A1* | 6/2016 | Lee | G06Q 10/06393 705/7.39 |
| 2016/0196371 A1* | 7/2016 | Nakamura | G06F 30/20 703/6 |
| 2016/0266728 A1* | 9/2016 | Sankhavaram | G06F 11/323 |
| 2016/0334766 A1* | 11/2016 | Tsuji | G05B 15/02 |

\* cited by examiner

[FIG. 1]
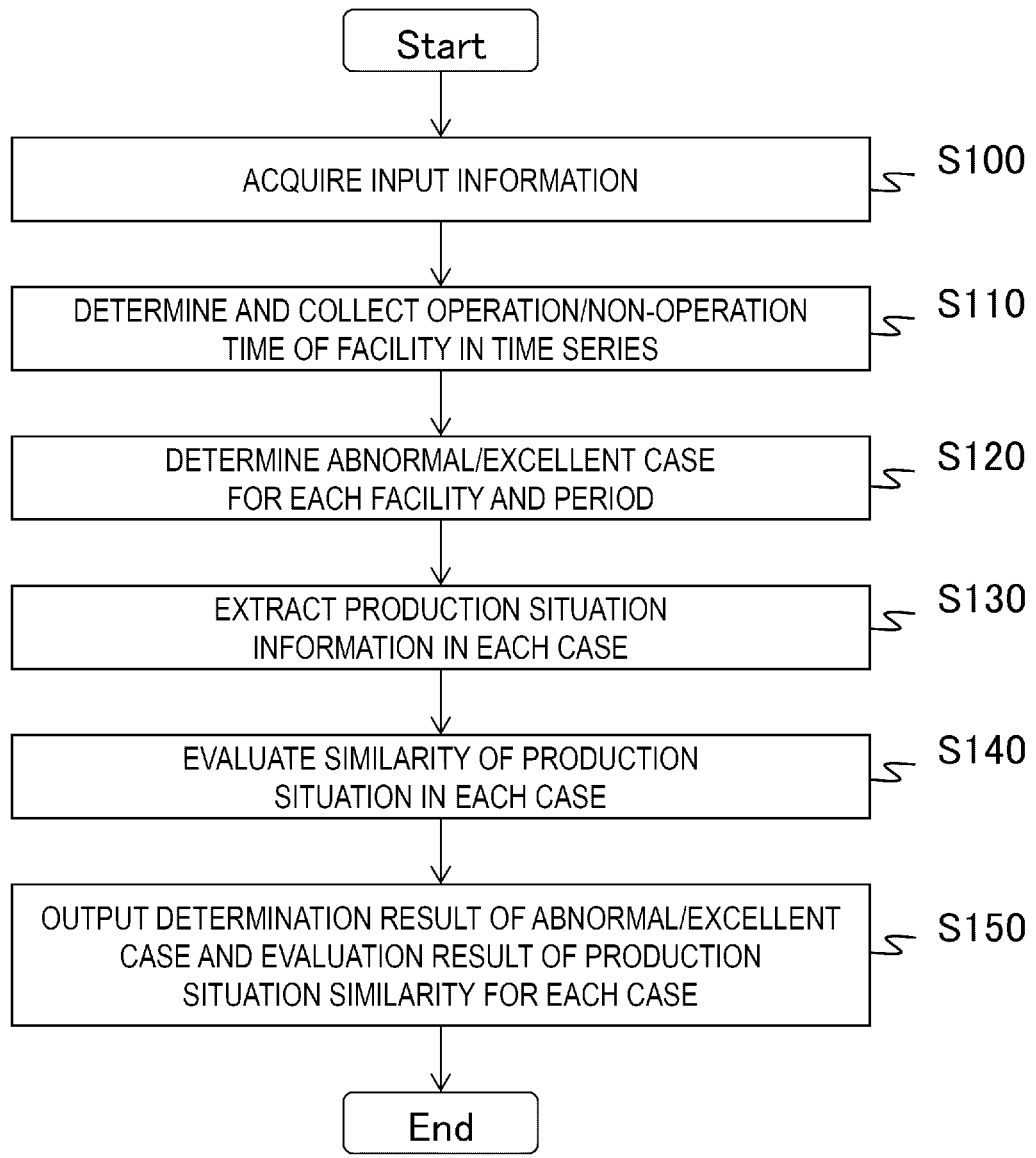

[FIG. 2]
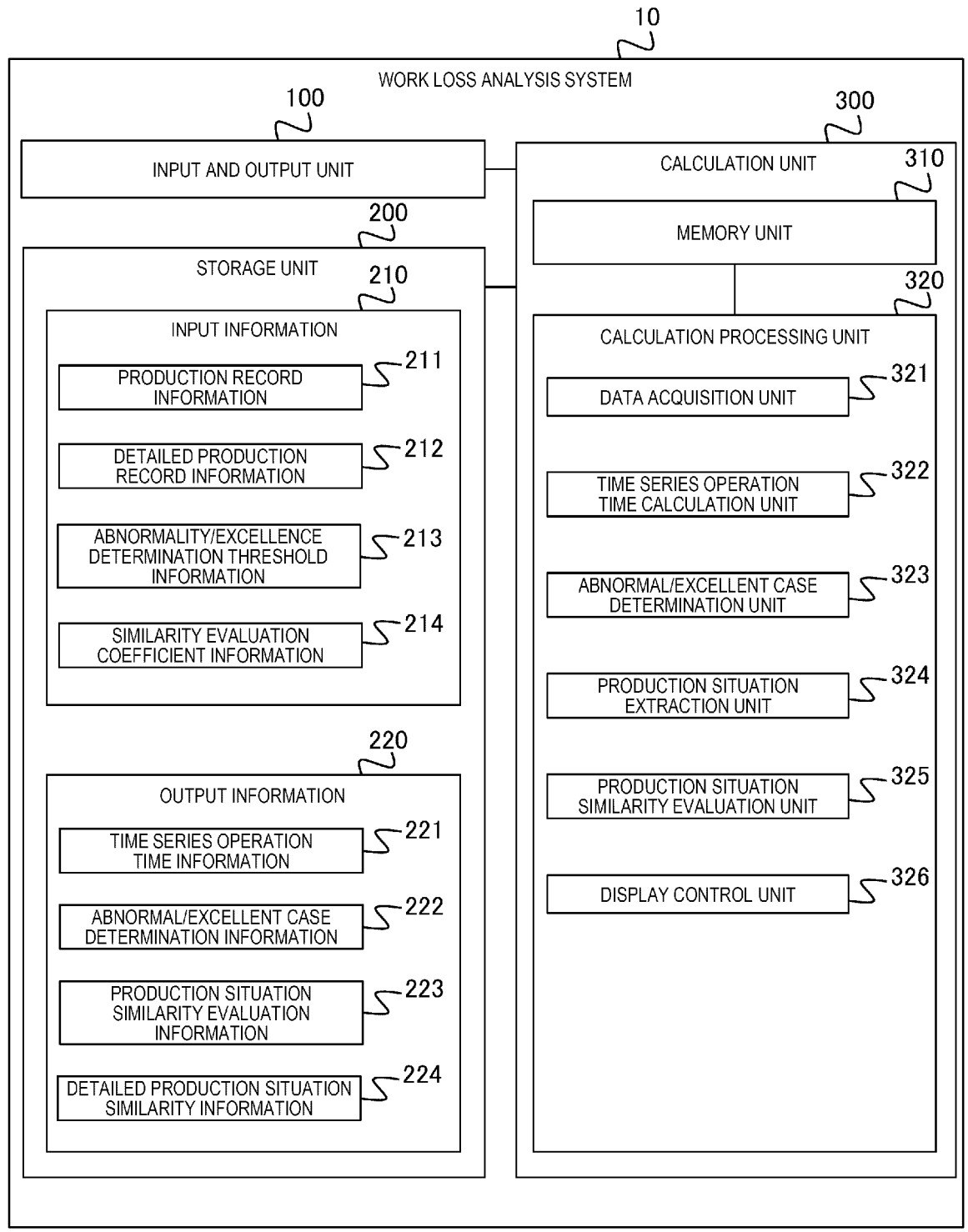

[FIG. 3]

| PROCESSING ID | DATE | WORKER ID | FACILITY | PRODUCT | QUANTITY | START TIME | END TIME |
|---|---|---|---|---|---|---|---|
| 1001 | 6/3 | A01 | M01 | P01 | 2 | 08:00 | 08:30 |
| 1002 | 6/3 | A02 | M01 | P02 | 3 | 08:30 | 09:30 |
| 1003 | 6/3 | A01 | M01 | P01 | 5 | 09:30 | 11:00 |
| ... | ... | ... | ... | ... | ... | ... | ... |
| 1011 | 6/12 | A01 | M01 | P01 | 7 | 08:00 | 10:30 |
| 1012 | 6/12 | A03 | M01 | P02 | 2 | 11:00 | 11:30 |
| 1013 | 6/12 | A03 | M01 | P01 | 1 | 11:30 | 12:00 |
| ... | ... | ... | ... | ... | ... | ... | ... |
| 2001 | 6/21 | B01 | M01 | P03 | 3 | 08:00 | 09:30 |
| 2002 | 6/21 | B02 | M01 | P04 | 5 | 10:00 | 12:00 |
| 2003 | 6/21 | B03 | M01 | P05 | 2 | 13:00 | 14:00 |

[FIG. 4]

| PROCESSING ID | OPERATION SITUATION | OPERATION CLASSIFICATION | OPERATION TIME |
|---|---|---|---|
| 1001 | PROCESSING | NET | 0.2h |
| 1001 | SETUP | INCIDENTAL | 0.1h |
| 1001 | CONFIRMATION | INCIDENTAL | 0.2h |
| 1011 | PROCESSING | NET | 1.0h |
| 1011 | SETUP | INCIDENTAL | 0.5h |
| 1011 | CONFIRMATION | INCIDENTAL | 0.5h |
| 1011 | ABNORMAL STOP | INCIDENTAL | 0.5h |

[FIG. 5]

| FACILITY (501) | CLASSIFICATION (502) | NET OPERATION RATE (503) | RANGE (504) | 213 |
|---|---|---|---|---|
| M01 | ABNORMAL | 50% | OR LESS | |
| M01 | EXCELLENT | 70% | OR MORE | |
| M02 | ABNORMAL | 45% | OR LESS | |
| M02 | EXCELLENT | 65% | OR MORE | |
| ⋮ | | | | |

[FIG. 6]

| PRODUCTION SITUATION (601) | WEIGHT COEFFICIENT (602) | 214 |
|---|---|---|
| WORKER | 1 | |
| FACILITY | 1 | |
| PRODUCT | 0.5 | |
| OPERATION SITUATION | 0.5 | |
| ⋮ | | |

[FIG. 7]

| CASE ID | DATE | FACILITY | OPERATION SITUATION | OPERATION CLASSIFICATION | TOTAL TIME |
|---|---|---|---|---|---|
| C001 | 6/3 | M01 | PROCESSING | NET | 3h |
| C001 | 6/3 | M01 | SETUP | INCIDENTAL | 3h |
| C001 | 6/3 | M01 | CONFIRMATION | INCIDENTAL | 4h |
| C002 | 6/12 | M01 | PROCESSING | NET | 4h |
| C002 | 6/12 | M01 | SETUP | INCIDENTAL | 1.5h |
| C002 | 6/12 | M01 | CONFIRMATION | INCIDENTAL | 1.0h |
| C002 | 6/12 | M01 | ABNORMAL STOP | INCIDENTAL | 3h |
| C002 | 6/12 | M01 | NON-OPERATION | WAITING | 0.5h |
| C100 | 6/24 | M01 | PROCESSING | NET | 7h |
| C100 | 6/24 | M01 | SETUP | INCIDENTAL | 1.5h |
| C100 | 6/24 | M01 | CONFIRMATION | INCIDENTAL | 1.5h |
| ⋮ | | | | | |

[FIG. 8]

| CASE ID | CLASSIFICATION | NET OPERATION RATE |
|---|---|---|
| C001 | ABNORMAL | 30% |
| C002 | ABNORMAL | 40% |
| C003 | ABNORMAL | 45% |
| C100 | EXCELLENT | 70% |
| C101 | EXCELLENT | 80% |
| C102 | NORMAL | 60% |
| C103 | EXCELLENT | 80% |
| ⋮ | | |

[FIG. 9]

| ORIGINAL CASE ID | REFERENCE CASE ID | OVERALL SIMILARITY | WORKER SIMILARITY | FACILITY SIMILARITY | PRODUCT SIMILARITY | OPERATION SITUATION SIMILARITY |
|---|---|---|---|---|---|---|
| C001 | C100 | 2.71 | 0.93 | 1 | 0.93 | 0.63 |
| C001 | C101 | 2.44 | 0.64 | 1 | 1 | 0.59 |
| C001 | C102 | 2.43 | 0.82 | 1 | 0.56 | 0.66 |
| ⋮ | | | | | | |

[FIG. 10]

| ORIGINAL CASE ID | REFERENCE CASE ID | PRODUCTION SITUATION | CASE ITEM | ORIGINAL CASE VALUE | REFERENCE CASE VALUE |
|---|---|---|---|---|---|
| C001 | C100 | WORKER | A01 | 9h | 9.5h |
| C001 | C100 | WORKER | A02 | 1h | 5h |
| C001 | C100 | FACILITY | M01 | 10h | 10h |
| C001 | C100 | PRODUCT | P01 | 7.5h | 7h |
| C001 | C100 | PRODUCT | P02 | 2.5h | 3h |
| C001 | C100 | OPERATION SITUATION | PROCESSING | 3h | 7h |
| C001 | C100 | OPERATION SITUATION | SETUP | 1h | 1.5h |
| C001 | C100 | OPERATION SITUATION | CONFIRAMTION | 6h | 1.5h |
| C001 | C101 | WORKER | A01 | 9h | 5h |
| C001 | C101 | WORKER | A02 | 1h | 5h |
| ⋮ | | | | | |

[FIG. 11]
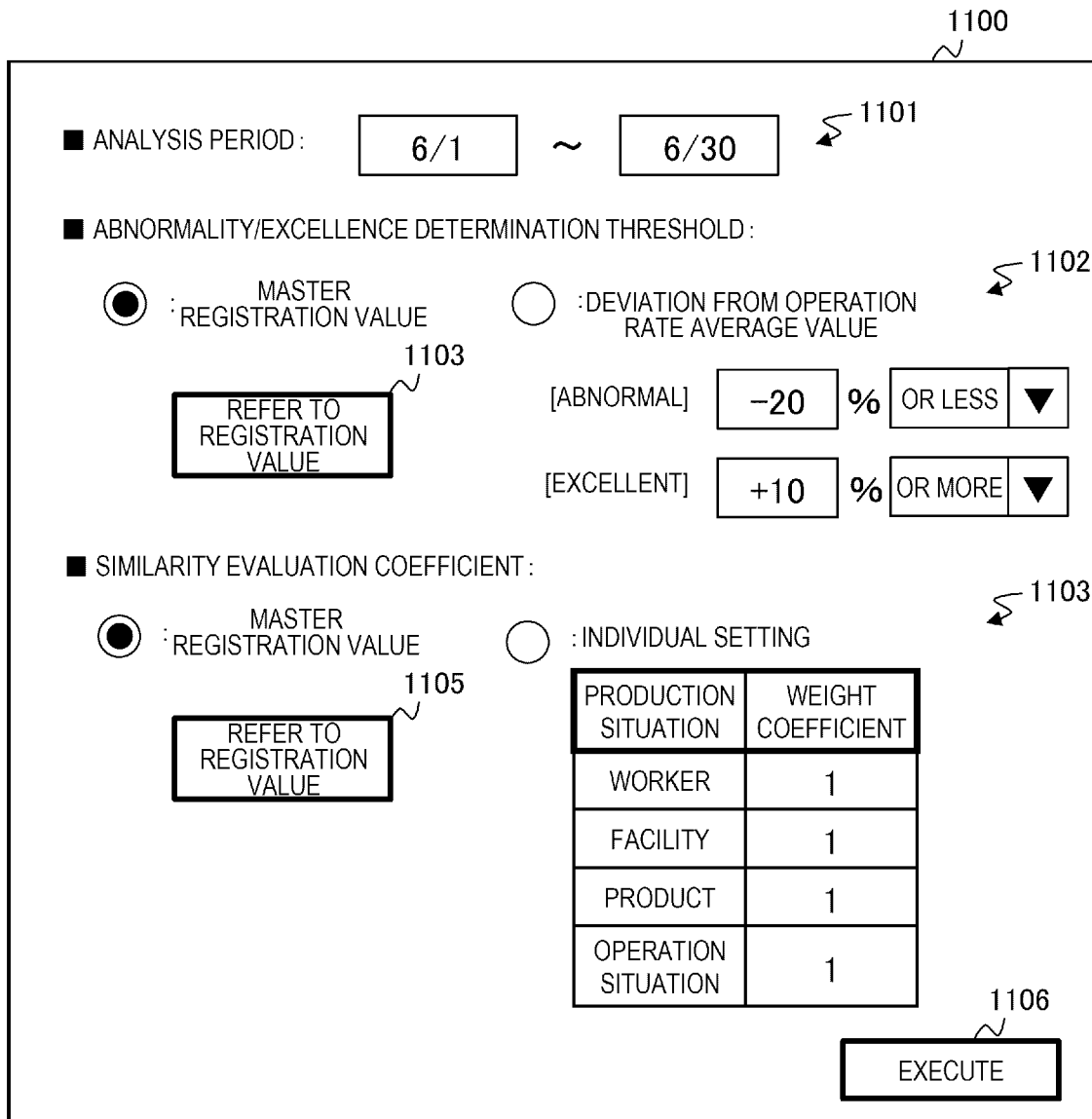

[FIG. 12]
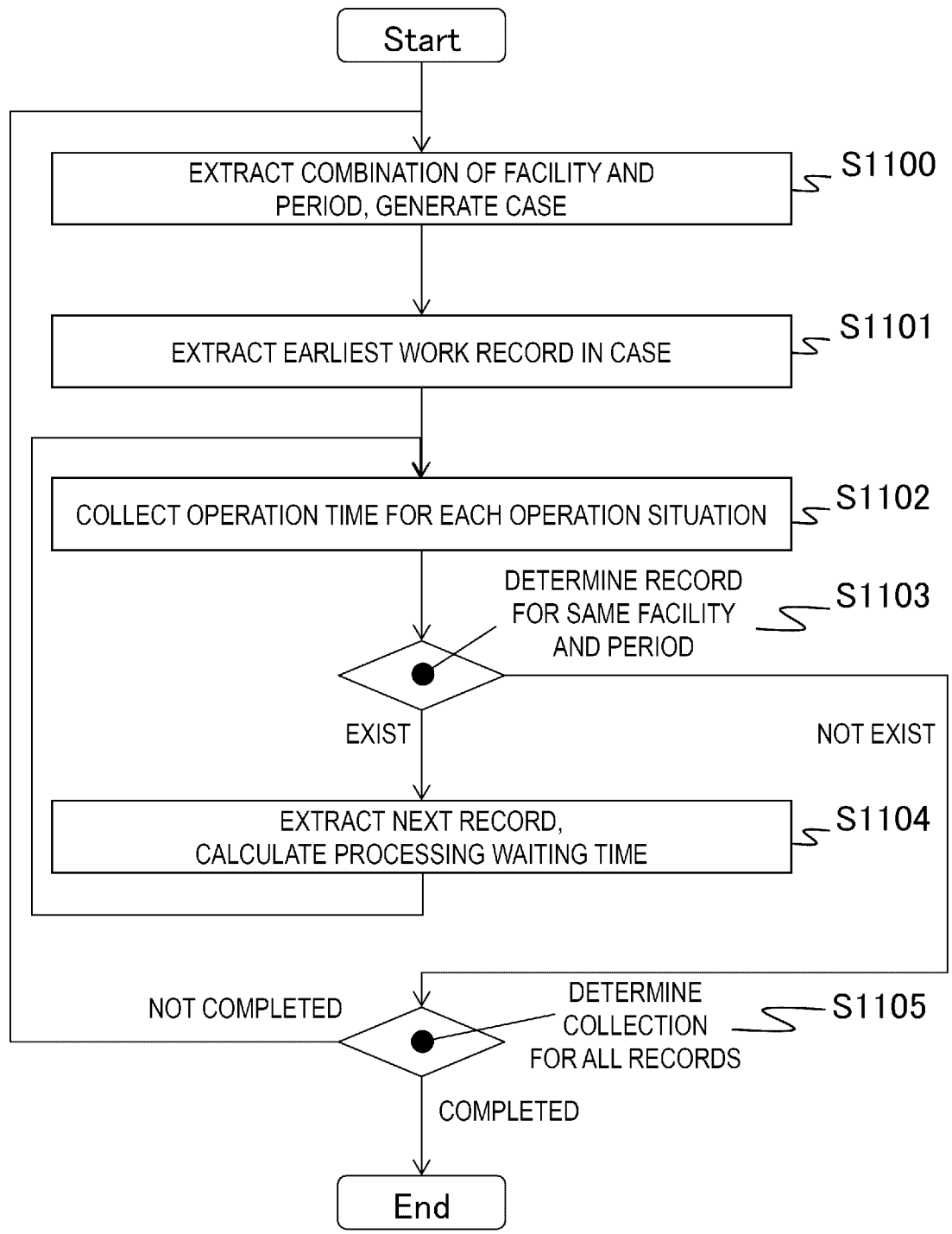

[FIG. 13]

| CASE ID 1301 | PRODUCTION SITUATION 1302 | CASE ITEM 1303 | CASE VALUE 1304 |
|---|---|---|---|
| C001 | WORKER | A01 | 0.5h |
| C001 | FACILITY | M01 | 0.5h |
| C001 | PRODUCT | P01 | 0.5h |
| C001 | OPERATION SITUATION | PROCESSING | 0.2h |
| C001 | OPERATION SITUATION | SETUP | 0.1h |
| C001 | OPERATION SITUATION | CONFIRMATION | 0.2h |

[FIG. 14]

| CASE ID | PRODUCTION SITUATION | CASE ITEM | CASE VALUE |
|---|---|---|---|
| C001 | WORKER | A01 | 9h |
| C001 | WORKER | A02 | 1h |
| C001 | FACILITY | M01 | 10h |
| C001 | PRODUCT | P01 | 7.5h |
| C001 | PRODUCT | P02 | 2.5h |
| C001 | OPERATION SITUATION | PROCESSING | 3h |
| C001 | OPERATION SITUATION | SETUP | 1h |
| C001 | OPERATION SITUATION | CONFIRMATION | 6h |
| C100 | WORKER | A01 | 9.5h |
| C100 | WORKER | A02 | 0.5h |
| C100 | FACILITY | M01 | 10h |
| C100 | PRODUCT | P01 | 7h |
| C100 | PRODUCT | P02 | 3h |
| C100 | OPERATION SITUATION | PROCESSING | 7h |
| C100 | OPERATION SITUATION | SETUP | 1.5h |
| C100 | OPERATION SITUATION | CONFIRMATION | 1.5h |
| C101 | WORKER | A01 | 5h |
| C101 | WORKER | A02 | 5h |
| ⋮ | | | |

1301 — CASE ID
1302 — PRODUCTION SITUATION
1303 — CASE ITEM
1304 — CASE VALUE

[FIG. 15]
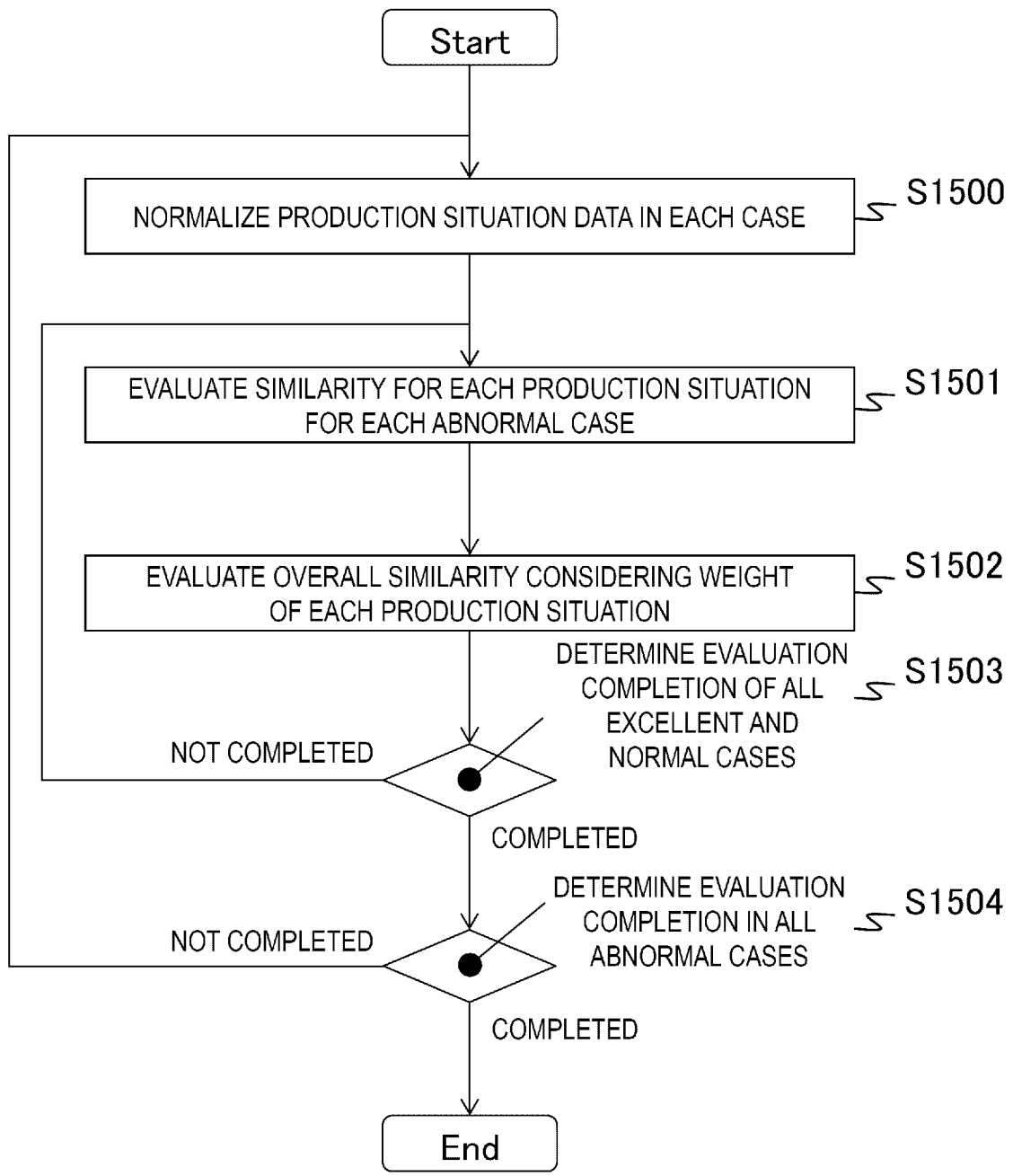

[FIG. 16]

| CASE ID (1301) | PRODUCTION SITUATION (1302) | CASE ITEM (1303) | CASE VALUE (NORMALIZED) (1601) |
|---|---|---|---|
| C001 | WORKER | A01 | 0.9 |
| C001 | WORKER | A02 | 0.1 |
| C001 | FACILITY | M01 | 1 |
| C001 | PRODUCT | P01 | 0.75 |
| C001 | PRODUCT | P02 | 0.25 |
| C001 | OPERATION SITUATION | PROCESSING | 0.3 |
| C001 | OPERATION SITUATION | SETUP | 0.1 |
| C001 | OPERATION SITUATION | CONFIRMATION | 0.6 |
| C100 | WORKER | A01 | 0.95 |
| C100 | WORKER | A02 | 0.05 |
| C100 | FACILITY | M01 | 1 |
| C100 | PRODUCT | P01 | 0.7 |
| C100 | PRODUCT | P02 | 0.3 |
| C100 | OPERATION SITUATION | PROCESSING | 0.7 |
| C100 | OPERATION SITUATION | SETUP | 0.15 |
| C100 | OPERATION SITUATION | CONFIRMATION | 0.15 |
| C101 | WORKER | A01 | 0.5 |
| C101 | WORKER | A02 | 0.5 |
| ⋮ | | | |

[FIG. 17]
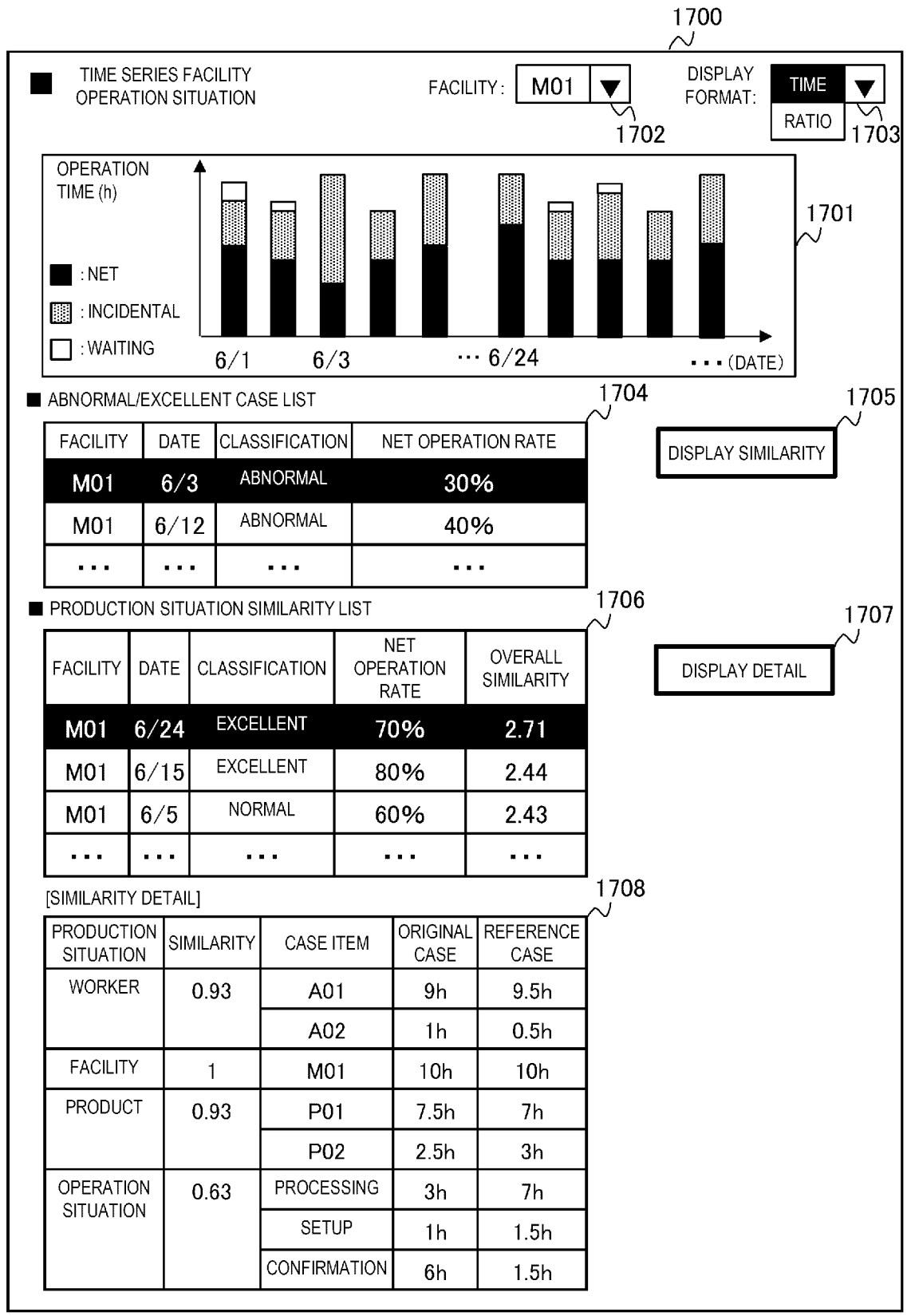

ANALYSIS SYSTEM AND ANALYSIS METHOD

CLAIM OF PRIORITY

The present application claims priority from Japanese patent application JP 2019-205935 filed on Nov. 14, 2019, the content of which is hereby incorporated by reference into this application.

TECHNICAL FIELD

The present invention relates to a system that analyzes work loss and the like of a production site in a factory that produces a product.

BACKGROUND ART

As a background art of the invention, there is a technique disclosed in JP-A-2013-162310 (PTL 1). PTL 1 discloses "a loss cost analysis system for a manufacturing process configured to set a "manufacturing loss definition parameter" that shows a relationship among record cost, production record information of each manufacturing process, and various losses and loss cost when calculating loss cost of each manufacturing process, and automatically calculate how much loss cost is generated in the record cost based on the manufacturing loss definition parameter".

CITATION LIST

Patent Literature

PTL 1: JP-A-2013-162310

SUMMARY OF INVENTION

Technical Problem

Asocial infrastructure system product, such as a control panel, includes a plurality of control panels and various units, and is an individual ordered design product that is designed with a product configuration that meets customer orders, manufactured, tested, and shipped. These products are produced by high-mix low-volume, and required facilities and components differ for each product. Therefore, due to an order for manufacturing products, skills of workers, capability of facilities, and the like, work loss such as an increase in waiting time such as setup or waiting for components may occur. Since these products have low work repeatability, it is difficult to specify factors that cause the work loss, and consideration of work improvement measures largely depends on the experience of skilled workers and case studies from time to time. Therefore, it is important to specify the cause of the work loss that reduces the productivity at an early stage, and to make a countermeasure.

Considering this, PTL 1 discloses a method of defining a relationship between each work loss and loss cost, calculating manufacturing loss cost, and prioritizing high-cost work loss. However, the method defines the cost of work loss for the manufacturing process of products and components with high repeatability. It is difficult to define and evaluate the loss for the work of products and components having low repeatability such as high-mix low-volume production.

Therefore, an object of the invention is to provide a work loss analysis system that specifies a cause of occurrence of work loss even for a work of products and components having low repeatability.

Solution to Problem

In order to solve at least one of the problems described above, the invention provides an analysis system including: a calculation unit; a storage unit; and an input and output unit. The storage unit stores record information related to operation time of an activity for producing a product, and threshold information for determining whether the activity of producing the product is abnormal based on the operation time. The calculation unit is configured to determine the operation time and non-operation time for each case extracted from the record information, determine an abnormality for each case based on the operation time for each case and the threshold information, and output information of comparing the operation time of a case determined to be abnormal with the operation time of a case not determined to be abnormal to the input and output unit.

Advantageous Effect

According to an aspect of the invention, even in a factory that produces high-mix low-volume products, it is possible to efficiently extract a cause of occurrence of work loss by extracting production records in an abnormal state where an operation rate is low and an excellent state where the operation rate is high for a certain period, and comparing a difference in an operation state, such as workers, facilities, products and components related to production during the period. As a result, it is possible to preferentially consider a work improvement measure for a point where the difference in the operation state is large, and it is possible to support improvement activities aimed at improving facility operation rate and increasing throughput. Problems, configurations, and effects other than those described above will become apparent from the following description of an embodiment.

BRIEF DESCRIPTION OF DRAWINGS

FIG. 1 is a flowchart showing an example of processing according to an embodiment of the invention.

FIG. 2 is a functional block diagram showing a system configuration according to the embodiment of the invention.

FIG. 3 is an explanatory diagram of production record information stored by a work loss analysis system according to the embodiment of the invention.

FIG. 4 is an explanatory diagram of detailed production record information stored by the work loss analysis system according to the embodiment of the invention.

FIG. 5 is an explanatory diagram of abnormality/excellence determination threshold information stored by the work loss analysis system according to the embodiment of the invention.

FIG. 6 is an explanatory diagram of similarity evaluation coefficient information stored by the work loss analysis system according to the embodiment of the invention.

FIG. 7 is an explanatory diagram of time series operation time information stored by the work loss analysis system according to the embodiment of the invention.

FIG. 8 is an explanatory diagram of abnormal/excellent case determination information stored by the work loss analysis system according to the embodiment of the invention.

FIG. 9 is an explanatory diagram of production situation similarity evaluation information stored by the work loss analysis system according to the embodiment of the invention.

FIG. 10 is an explanatory diagram of detailed production situation similarity information stored by the work loss analysis system according to the embodiment of the invention.

FIG. 11 is an explanatory diagram of an input screen displayed by the work loss analysis system according to the embodiment of the invention.

FIG. 12 is a flowchart showing processing of determining and collecting the operation/non-operation time of each facility in time series executed by the work loss analysis system according to the embodiment of the invention.

FIG. 13 is an explanatory diagram of a production situation extracted by the work loss analysis system according to the embodiment of the invention.

FIG. 14 is an explanatory diagram of the production situation extracted by the work loss analysis system according to the embodiment of the invention.

FIG. 15 is a flowchart showing processing of evaluating a similarity between cases by the work loss analysis system according to the embodiment of the invention.

FIG. 16 is an explanatory diagram of a production situation normalized by the work loss analysis system according to the embodiment of the invention.

FIG. 17 is an explanatory diagram showing an example of a screen output by a work loss analysis system 10 according to the embodiment of the invention.

DESCRIPTION OF EMBODIMENTS

Hereinafter, a method for implementing the invention will be described below with reference to the drawings.

FIG. 1 is a flowchart showing an example of processing according to an embodiment of the invention. FIG. 2 is a functional block diagram showing a system configuration according to the embodiment of the invention.

In FIG. 2, the work loss analysis system 10 is an apparatus including a PC such as a server or a terminal and software installed in the PC, and includes an input and output unit 100, a storage unit 200, and a calculation unit 300.

The input and output unit 100 is for acquiring data necessary for processing of the calculation unit 300 and displaying a processing result, and includes, for example, an input device such as a keyboard and a mouse, a communication device that communicates with the outside, a recording and reproducing device for a disc-type storage medium, and an output device such as a CRT or a liquid crystal monitor.

The storage unit 200 includes input information 210 used in the processing of the calculation unit 300 and output information 220 for storing a processing result, and is constituted by a storage device such as a hard disk drive or a memory.

The input information 210 includes production record information 211, detailed production record information 212, abnormality/excellence determination threshold information 213, and similarity evaluation coefficient information 214. These pieces of information are described below.

FIG. 3 is an explanatory diagram of the production record information 211 stored by the work loss analysis system 10 according to the embodiment of the invention.

The production record information 211 is information for managing a record of an actual work at a manufacturing site. For example, as shown in FIG. 3, the production record information 211 includes information of a processing ID 301, a date 302, a worker ID 303, a facility 304, a product 305, a quantity 306, a start time 307 and an end time 308. In the production record information 211 of FIG. 3, for example, values from the date 302 to the end time 308 corresponding to a value "1001" of the processing ID 301 indicate a record that a worker "A01" processes a product "P01" with a facility "M01" by "2 (units)" on a date "6/3", and that the work at that time is performed during a time zone from "08:00" to "08:30".

FIG. 4 is an explanatory diagram of the detailed production record information 212 stored by the work loss analysis system 10 according to the embodiment of the invention.

The detailed production record information 212 is information for managing details such as facility operation logs in each processing time zone with respect to the production record information 211. For example, as shown in FIG. 4, the detailed production record information 212 includes information of a processing ID 401, an operation situation 402, an operation classification 403, and an operation time 404. In the detailed production record information 212 of FIG. 4, for example, values from the operation situation 402 to the operation time 404 corresponding to a value "1001" of the processing ID 401 indicate that the work whose operation situation is "processing", "setup", and "confirmation" is performed for "0.2 h", "0.1 h", and "0.2 h", respectively.

In addition, in this example, operation classification such as "net" or "incidental" is provided for each operation situation, which defines work that directly adds value in the production of the product as "net (time)" and other work such as preparation as "incidental (time)". A method of using the operation classification will be described later.

In the example of FIG. 4, the operation classification of the operation situation "processing" is "net". In addition, the operation classification of the operation situations of "setup", "confirmation" and "abnormal stop" is "incidental". Further, although omitted in FIG. 4, for example, the operation situation may be "non-operation", and the operation classification corresponding thereto may be "waiting" (see FIG. 7). "Processing" indicates a situation for processing the product or components thereof, "setup" indicates a situation for preparing for the processing, and "confirmation" indicates a situation for confirming a processing result. The abnormal stop indicates a situation in which the work is stopped due to a failure of the facility or the like. In addition, the "non-operation" corresponding to the "waiting" indicates a situation in which the worker and the facility are in an operable state, but the work is not performed as a result of waiting for a target product or the like (for example, completion of work of a corresponding previous step).

In this example, the situation in which the worker and the facility are operating is further classified into "net" and "incidental", and the situation of "non-operation" is defined in addition to the above. However, among these, only "net" may be defined as a situation of operation (that is, time thereof is counted as an operation time), and "incidental" may be classified as non-operation (that is, time of incidental work may be counted as a non-operation time).

FIG. 5 is an explanatory diagram of the abnormality/excellence determination threshold information 213 stored by the work loss analysis system 10 according to the embodiment of the invention.

The abnormality/excellence determination threshold information 213 is information for storing a threshold for determining an abnormal state with low operation rate of net work (large work loss) or an excellent state with high operation rate of net work (small work loss) with respect to daily production record at the manufacturing site. For example, as shown in FIG. 5, the abnormality/excellence determination threshold information 213 includes information of a facility 501, a classification 502, a net operation rate 503, and a range 504. In the abnormality/excellence determination threshold information 213 of FIG. 5, values from the classification 502 to the range 504 corresponding to a value "M01" of the facility 501 indicate that, in the facility "M01", it is determined as "abnormal" if the net operation rate is "50%" or less, and as "excellent" if the net operation rate is "70%" or more.

FIG. 6 is an explanatory diagram of the similarity evaluation coefficient information 214 stored by the work loss analysis system 10 according to the embodiment of the invention.

The similarity evaluation coefficient information 214 is information used when evaluating a case of another date in which the production situation at that time is similar to the above-mentioned abnormal state or excellent state. For example, as shown in FIG. 6, the similarity evaluation coefficient information 214 includes information of a production situation 601 and a weight coefficient 602. The similarity evaluation coefficient information 214 of FIG. 6 indicates that, when comparing each abnormal state or excellent state with another case, for example, a weight of the similarity of "worker" or "facility" is set to "1", and a weight of the similarity of "product" and "operation situation" is set to "0.5". In the present embodiment, it is assumed that the larger the similarity is, the more similar to an abnormal or excellent case. A method of evaluating the similarity will be described later.

In the present embodiment, information related to activities (for example, processing, setup work, waiting for the product) for producing the product and the like using a certain facility on a certain day is regarded as one case. However, this is an example, and any predetermined period such as one shift may be adopted instead of one day.

The output information 220 includes time series operation time information 221, abnormal/excellent case determination information 222, production situation similarity evaluation information 223, and detailed production situation similarity information 224. Each piece of information will be described below.

FIG. 7 is an explanatory diagram of the time series operation time information 221 stored by the work loss analysis system 10 according to the embodiment of the invention.

The time series operation time information 221 is information for managing an operation situation and time for a certain period in each facility. For example, as shown in FIG. 7, the time series operation time information 221 includes information of a case ID 701, a date 702, a facility 703, an operation situation 704, an operation classification 705, and a total time 706. In the time series operation time information 221 of FIG. 7, values from the date 702 to the total time 706 corresponding to a value "C001" of the case ID indicate that, on a date "6/3", a total time of the operation situation of "processing" of the facility "M01" is "3 h" (3 hours), a total time of the operation situation of "setup" is "3 h", and a total time of the operation situation of "confirmation" is "4 h", and the operation classifications of the operation situations "processing", "setup" and "confirmation" are "net", "incidental" and "incidental", respectively.

FIG. 8 is an explanatory diagram of the abnormal/excellent case determination information 222 stored by the work loss analysis system 10 according to the embodiment of the invention.

The abnormal/excellent case determination information 222 is information for managing a result of determining whether each case is in an abnormal state or an excellent state based on an operation situation of each facility for a certain period of time. For example, as shown in FIG. 8, the abnormal/excellent case determination information 222 includes information of a case ID 801, a classification 802, and a net operation rate 803. In the abnormal/excellent case determination information 222 of FIG. 8, values of the classification 802 and the net operation rate 803 corresponding to a value "C001" of the case ID 801 indicate that, on the date "6/3" corresponding to the case "C001" (see FIG. 7), the operation rate of the net work of the corresponding facility "M01" (see FIG. 7) is "30%", which is in an "abnormal" state. A method of calculating the net operation rate and a method of determining abnormality and excellence will be described later.

FIG. 9 is an explanatory diagram of the production situation similarity evaluation information 223 stored by the work loss analysis system 10 according to the embodiment of the invention.

The production situation similarity evaluation information 223 is information for managing a result of evaluating similarity of the production situation between a case determined to be abnormal or excellent in the above processing and another case. For example, as shown in FIG. 9, the production situation similarity evaluation information 223 includes information of an original case ID 901, a reference case ID 902, an overall similarity 903, a worker similarity 904, a facility similarity 905, a product similarity 906, and an operation situation similarity 907.

Values from the overall similarity 903 to the operation situation similarity 907 in a first row of the production situation similarity evaluation information 223 shown in FIG. 9 indicate a similarity when a production situation of the facility "M01" on the date "6/3" corresponding to the case ID "C001" is compared with a production situation of the facility corresponding to a case ID "C100" on the date corresponding to the case ID "C100". Specifically, this example shows that the overall similarity 903 is "2.71", the worker similarity 904, the facility similarity 905, the product similarity 906, and the operation situation similarity 907 are "0.93", "1", "0.93", and "0.63", respectively.

Similarly, a second row of the production situation similarity evaluation information 223 shown in FIG. 9 indicates the similarity when the production situation in the case of the original case ID "C001" and a production situation in a case of the reference case ID "C101" are compared. In this example, the overall similarity is "2.44", which indicates that the similarity of the production situation is low as compared with the above-mentioned "C100". A method of evaluating the production situation similarity will be described later.

FIG. 10 is an explanatory diagram of the detailed production situation similarity information 224 stored by the work loss analysis system 10 according to the embodiment of the invention.

The detailed production situation similarity information 224 is information for managing information serving as a calculation basis of the above-mentioned production situation similarity evaluation information 223. For example, as shown in FIG. 10, the detailed production situation similarity information 224 includes information of an original case ID 1001, a reference case ID 1002, a production situation 1003, a case item 1004, an original case value 1005, and a reference case value 1006. The detailed production situation similarity information 224 shown in FIG. 10 indicates that, for example, when the original case ID "C001" and the reference case ID "C100" are compared from the viewpoint of the "worker", working hours of a worker "A01" and a worker "A02" are "9 h" and "1 h" in the case "C001", respectively, and are "9.5 h" and "5 h" in the case "C100", respectively.

Reference is made to FIG. 2 again. The calculation unit 300 is for acquiring data necessary for calculation from the input information 210 of the input and output unit 100 or the storage unit 200, and outputting a processing result to the output information 220 of the storage unit 200, and includes a calculation processing unit 320 that actually performs the calculation processing and a memory unit 310 that serves as a work area for the calculation processing in the calculation processing unit 320.

The memory unit 310 is for temporarily storing data acquired from the input information 210 of the input and output unit 100 or the storage unit 200, or a result processed by the calculation processing unit 320.

The calculation processing unit 320 includes a data acquisition unit 321, a time series operation time calculation unit 322, an abnormal/excellent case determination unit 323, a production situation extraction unit 324, a production situation similarity evaluation unit 325, and a display control unit 326.

The data acquisition unit 321 acquires information necessary for the processing of the calculation processing unit 320 from the input information 210 based on an area usage planning period and planning condition information input by the user from the input and output unit 100, and stores the information in the memory unit 310. The time series operation time calculation unit 322 determines, based on the production record information 211 and the detailed production record information 212, operation/non-operation of each facility for a certain period over time series, and collects time for each operation situation. The abnormal/excellent case determination unit 323 determines the abnormal state or the excellent state based on the operation time in each facility and period and the abnormality/excellence determination threshold information 213.

The production situation extraction unit 324 extracts a production situation such as the worker, the facility, the product, and the operation situation related to abnormal/excellent cases. The production situation similarity evaluation unit 325 evaluates the similarity between the abnormal/excellent cases based on the production situation. The display control unit 326 stores results calculated and evaluated by the above processing units in the time series operation time information 221, the abnormal/excellent case determination information 222, the production situation similarity evaluation information 223, and the detailed production situation similarity information 224, and displays the results on the input and output unit 100.

Next, operation of each function in the work loss analysis system 10 of FIG. 2 will be described with reference to the flowchart shown in FIG. 1. First, input of information by the user will be described with reference to FIG. 11.

FIG. 11 is an explanatory diagram of an input screen displayed by the work loss analysis system 10 according to the embodiment of the invention.

An input screen 1100 shown in FIG. 11 is displayed by the output device included in the input and output unit 100 of the work loss analysis system 10. The user can input various kinds of information by operating each unit on the screen by using the input device included in the input and output unit 100 with reference to the input screen 1100. In this example, the input screen 1100 includes an analysis period input unit 1101, an abnormality/excellence determination threshold input unit 1102, a similarity evaluation coefficient input unit 1104, and an execution button 1106.

First, in order to analyze the work loss at the manufacturing site from a past production record, the user can start the processing of the work loss analysis system 10 by, for example, as shown in FIG. 11, inputting a period of a production record to be analyzed from the analysis period input unit 1101 of the input screen 1100, selecting or inputting a value to be used as an abnormality/excellence determination threshold and a similarity evaluation coefficient from the abnormality/excellence determination threshold input unit 1102 and the similarity evaluation coefficient input unit 1104, and clicking the execution button 1106.

Here, when a "master registration value" is selected as the abnormality/excellence determination threshold, a value of the abnormality/excellence determination threshold information 213 as shown in FIG. 5 is used. The user can confirm information on another screen by clicking a registration value reference button 1103. On the other hand, when "deviation from an operation rate average value" is selected, the user inputs the deviation from the operation rate average value at the time of determining the abnormality or the excellence. An example of the input screen shown in FIG. 11 indicates that it is set to be determined as abnormal when the operation rate of a determination target is −20% or less than the operation rate average value (for example, when the operation rate of the determination target is 40% or less if the operation rate average value is 50%) and as excellent when the operation rate is +10% or more than the operation rate average value (for example, when the operation rate of the determination target is 55% or more if the operation rate average value is 50%).

When the "master registration value" is selected as the similarity evaluation coefficient, a value of the similarity evaluation coefficient information 214 as shown in FIG. 6 is used. The user can confirm information on another screen by clicking a registration value reference button 1105. On the other hand, when "individual setting" is selected, the user inputs a weight coefficient of each production situation at the time of determining the production situation similarity of each case. An example of the input screen shown in FIG. 11 indicates that a weight of each of the worker, the facility, the product, and the operation situation is set to "1", and the weights are evaluated equally. In the present embodiment, a case where the analysis period shown in FIG. 11 is input and the "master registration value" is selected as the abnormality/excellence determination threshold and the similarity evaluation coefficient (that is, the weights are set as shown in FIG. 6) will be described as an example.

Next, the data acquisition unit 321 acquires the input information 210 based on the analysis period input from the input and output unit 100 such as a terminal by the user and an acquisition condition of the abnormality/excellence determination threshold and the similarity evaluation coefficient and stores the input information 210 in the memory unit 310 (S100). In the present embodiment, as the input information 210, the production record information 211, the detailed production record information 212, the abnormality/excellence determination threshold information 213, and the similarity evaluation coefficient information 214 shown in FIGS. 3 to 6 are acquired, which will be described later.

Then, the time series operation time calculation unit 322 determines, based on the production record information 211 and the detailed production record information 212, operation/non-operation time of each facility for a certain period over time series, collects the time for each operation situation, and stores it in the memory unit 310 (S110). A detailed flow of the processing is shown in FIG. 12 and described below.

FIG. 12 is a flowchart showing processing of determining and collecting the operation/non-operation time of each facility in time series executed by the work loss analysis system 10 according to the embodiment of the invention.

First, the time series operation time calculation unit 322 extracts a combination of a facility and a period from the production record information 211, and generates a case ID (S1100). Here, an analysis period of the work loss is defined by a certain fixed date, shift, time zone, or the like. In the present embodiment, extraction of an analysis case of the work loss for each date and comparison between cases are described as follows. From the production record information 211 of FIG. 3, for example, in the record of the processing ID "1001", the date is "6/3" and the facility is "M01", and the case ID "C001" is generated for the combination.

Next, the time series operation time calculation unit 322 extracts an earliest work record from the production record information 211 for the extracted case (S1101). For example, in the production record information 211 of FIG. 3, among work records of the facility "M01" on the date "6/3" indicated by the case, an earliest start time is "08:00" of the processing ID "1001", and this record data is extracted.

Then, the time series operation time calculation unit 322 collects the operation time for each operation situation in the extracted work record from the detailed production record information 212 for each case (S1102). For example, in the detailed production record information 212 of FIG. 4, the operation time is "0.2 h" for the operation situation "processing" of the processing ID "1001". Similarly, the operation time "0.1 h" and "0.2 h" are extracted for the operation situations "setup" and "confirmation", respectively.

Thereafter, the time series operation time calculation unit 322 determines whether record data exists in the same facility and period from the production record information 211 (S1103). The processing moves to S1104 when the record data exists, and moves to S1105 when the record data does not exist. For example, in the production record information 211 of FIG. 3, since the record data on the date "6/3" and the facility "M01" indicated by the case exists, the processing moves to S1104.

Next, the time series operation time calculation unit 322 extracts the record data of a next work from the production record information 211, and calculates a processing waiting time with previous work (S1104). For example, in the production record information 211 of FIG. 3, since the earliest start time after the processing ID "1001" is "08:30" of the processing ID "1002", this record data is extracted. Since the end time of the processing ID "1001", which is the record data extracted in the previous processing, is "08: 30" and is the same as the start time of the next work, it is calculated that there is no waiting for the processing.

Thereafter, the time series operation time calculation unit 322 repeats the processing from S1102 to S1104 for all pieces of record data of the facility "M01" and the date "6/3", and collects a work time total value for each operation situation for the case ID "C001" as shown in FIG. 8.

Then, the time series operation time calculation unit 322 determines whether or not the case ID is generated and the operation time is collected for all the record data of the production record information 211 (S1105). When the record data for which the collection is not completed exists, the processing returns to S1100, and when the collection is completed, the processing ends. For example, in the production record information 211 shown in FIG. 3, the case ID of the number of facilities×date such as the case of the facility "M01", date "6/12", and the case of facility "M01", date "6/21" is generated, and the same processing is executed. In the present embodiment, description will be made below assuming that the above processing is executed to generate time series operation time information for each case shown in FIG. 7.

Here, data in which the operation situation and the operation classification of a case ID "C002" are "non-operation" and "waiting" are generated in step S1104 of the above processing flow. In the production record information 211 of FIG. 3, since the end time of the processing ID "1011" in the case is "10:30" and the start time of the processing ID "1012", which is the next record data, is "11:00", the facility is not operated for 30 minutes (0.5$h$) during that time, and it is calculated as non-operation time waiting for processing.

Next, returning to the processing flow of FIG. 1, the abnormal/excellent case determination unit 323 determines whether each case corresponds to the abnormal state or the excellent state based on the operation time in each facility and period and the abnormality/excellence determination threshold information 213, and stores it in the memory unit 310 (S120). For example, in the time series operation time of FIG. 7, since a total operation time of the case ID "C001" is 10 h, and the operation time for which the operation classification is "net" is only "3 h" for which the operation situation is "processing" among the total operation time, the operation rate of the net work is calculated as 30% (=3 h/10 h). Further, since the abnormality/excellence determination threshold information 213 of FIG. 5 indicates that the operation rate "50% or less" is determined to be in the abnormal state for the facility "M01", the case is determined to be "abnormal".

By performing the same processing on all the time series operation time, a determination result of the abnormal/ excellent case (that is, classification 802) and data of the net operation rate 803 shown in FIG. 8 are generated. In FIG. 8, in a case ID "C102", the classification is determined to be "normal", which indicates that the state does not correspond to any of the abnormal/excellent states as a result of comparison with the abnormality/excellence determination thresholds in FIG. 5.

In the present embodiment, the abnormality/excellence determination threshold information 213 includes a threshold for determining abnormality and a threshold for determining excellence. Based on the thresholds, it is determined whether a case is excellent/normal/abnormal. However, this is an example, and for example, only a threshold for determining whether or not the abnormality/excellence determination threshold information 213 is abnormal may be provided. Based on the threshold, whether or not the case is abnormal may be determined.

After that, the production situation extraction unit 324 extracts the production situation such as the worker, the facility, the product, and operation situation related to each production case from the production record information 211 or detailed production record information 212, and stores the production situation in the memory unit 310 (S130).

FIGS. 13 and 14 are explanatory diagrams of the production situation extracted by the work loss analysis system 10 according to the embodiment of the invention.

In the example of FIGS. 13 and 14, a set of a case ID 1301, a production situation 1302, a case item 1303, and a case value 1304 is extracted as the production situation.

For example, for the case ID "C001" (facility "M01", date "6/3") shown in FIG. 8, since the worker "A01" manufactures the product "P01" for "0.5 h (30 minutes)" in the processing ID "1001" in the production record information 211 of FIG. 3, data of the case item and the case value of the worker, the facility, and the product as shown in first to third rows of FIG. 13 is generated.

That is, the case IDs 1301 on the first to third rows are all "C001", and the production situations 1302 are "worker", "facility", and "product", respectively. Further, the case items 1303 corresponding to the "worker", "facility", and "product" are "A01", "M01", and "P01", respectively. The case values 1304 are all "0.5 h (30 minutes)".

Further, in the processing ID "1001" of the detailed production record information 212 of FIG. 4, since the operation time of the operation situations "processing", "setup" and "confirmation" are "0.2 h", "0.1 h" and "0.2 h" respectively, data of the case item and the case value for each operation situation as shown on fourth to sixth rows of FIG. 13 is generated.

In other words, the case IDs 1301 on the fourth to sixth rows are all "C001", the production situations 1302 are all "operation situation", and the case items 1303 are "processing", "setup" and "confirmation", respectively. Further, the case values 1304 corresponding to the "processing", "setup", and "confirmation" are "0.2 h", "0.1 h", and "0.2 h", respectively.

By performing the above processing for all cases shown in FIG. 8, production situations as shown in FIG. 14 are extracted.

Next, the production situation similarity evaluation unit 325 evaluates the similarity between cases based on the extracted production situation of each case (S140). A detailed flow of the processing is shown in FIG. 15 and described below.

FIG. 15 is a flowchart showing processing of evaluating the similarity between cases by the work loss analysis system 10 according to the embodiment of the invention.

First, the production situation similarity evaluation unit 325 normalizes production situation data in each case (S1500). In general, a total work time in each case differs depending on the date or the facility, and may be affected by a length of daily work time when evaluating the similarity between cases. Therefore, in the present embodiment, the similarity is evaluated using a ratio of the work time of each production situation to the total work time of each case. In an extraction result of the production situation of FIG. 14, for example, in the work time for each "worker", since the work time of the worker "A01" is "9 h" and the work time of the worker "A02" is "1 h", the normalized work time is calculated as "0.9" and "0.1", respectively. In the following description, when the same processing is performed for all case IDs and production situations, data in a range of 0 to 1 is generated for each item.

In the example of FIG. 15, a case determined to be abnormal is analyzed, and the similarity between the case and a case determined to be excellent or normal is calculated. However, this is an example, and, for example, the similarity between cases determined to be abnormal may be calculated, or the similarity between cases determined to be excellent or normal may be calculated.

FIG. 16 is an explanatory diagram of the normalized production situation extracted by the work loss analysis system 10 according to the embodiment of the invention.

Data items of the production situation shown in FIG. 16 are the same as those in FIGS. 13 and 14, except that the case value 1304 is replaced with a normalized case value 1601. As shown in the above example, values "0.9" and "0.1" obtained by normalizing the work time of the workers "A01" and "A02" are stored in first and second rows of FIG. 16. Similarly, normalized values in the range of 0 to 1 are stored for other items.

Next, the production situation similarity evaluation unit 325 evaluates, for each abnormal case determined in S120, the similarity for each production situation with other excellent or normal cases (S1501). In the present embodiment, the similarity for each production situation is calculated as a distance between cases, and is calculated based on the following Formulas, for example.

$$d_{ijk} = \frac{1}{1 + y_{ijk}} \quad \text{[Formula 1]}$$

$$y_{ijk} = \sqrt{\sum_l (x_{ikl} - x_{jkl})^2} \quad \text{[Formula 2]}$$

In the above Formula 1, a subscript i indicates an abnormal case ID which is an evaluation source of the similarity, a subscript j indicates an excellent case ID or a normal case ID which is a reference destination at the time of evaluation, and a subscript k indicates the production situation. In the present embodiment, it is assumed that k=1 is the worker, k=2 is the facility, k=3 is the product, and k=4 is the operation situation. Further, $d_{ijk}$ indicates the similarity between the abnormal case i and the excellent or normal case j in the production situation k, and $y_{ijk}$ indicates a distance between the cases related to the production situation k.

In the above Formula 1, the similarity $d_{ijk}$ takes a value of 0 to 1, and the closer it is to 1, the higher the similarity in the production situation. Further, in the above Formula 2, a subscript l indicates each case item in the production situation k, $x_{ikl}$ indicates a case value of the abnormal case i related to the case item, and $x_{jkl}$ indicates a case value of the excellent or normal case j.

Here, an example of evaluating the similarity between the case ID "C001" that is determined to be "abnormal" in FIG. 8 and the case "C100" that is determined to be "excellent" will be described. First, case values of the production situation in FIG. 16 are acquired for the case IDs. In this case, i corresponds to the case ID "C001" and j corresponds to the case ID "C100".

Next, for the set of production situation k and case item 1, a difference between these case values is taken and a result thereof is squared. For example, case values xiii and xiii of the case item "A01" in the production situation "worker" in FIG. 16 are "0.9" and "0.95", respectively. A difference $x_{i11}$-$x_{j11}$ is 0.05, and a squared value thereof is 0.0025. Hereinafter, similar processing is performed on the case item "A02". $y_{ij1}$ is calculated as "0.07" by applying Formula 2, and the similarity $d_{ij1}$ related to the worker is calculated as "0.93" by applying Formula 1. Hereinafter, the similar processing is performed on the production situations "facility", "product", and "operation situation" in FIG. 16, so that the similarities $d_{ij2}$, $d_{ij3}$, and $d_{ij4}$ are calculated as "1", "0.93", and "0.63", respectively.

Then, the production situation similarity evaluation unit 325 evaluates an overall similarity between the cases based on the similarity evaluation coefficient information 214 with respect to the similarity for each production situation evaluated in the above processing (S1502). In the present embodiment, four production situation similarities of the worker, the facility, the product, and the operation situation evaluated as described above are calculated by the following Formula by using a weight coefficient shown in the similarity evaluation coefficient information 214 of FIG. 6.

$$D_{ij} = \Sigma_k a_k d_{ijk} \quad \text{[Formula 3]}$$

In the above Formula 3, the subscripts i, j, and k are the same as those in the above Formula 1, and $a_k$ indicates a weight coefficient for each production situation. From FIG. 6, weight coefficients are $a_1=1$, $a_2=1$, $a_3=0.5$, and $a_4=0.5$, respectively. By applying Formula 3, the overall similarity between the abnormal case ID "C001" and the excellent case ID "C100" is calculated as "2.71".

After that, the production situation similarity evaluation unit 325 determines whether the similarity evaluation with all excellent or normal cases is performed for the abnormal case (S1503). When the similarity evaluation is completed, the processing moves to S1504. When the similarity evaluation is not completed, the similarity evaluation of S1501 and S1502 is performed for the next excellent or normal case.

Finally, the production situation similarity evaluation unit 325 determines whether the similarity evaluation with other cases is performed for all abnormal cases (S1504). When the similarity evaluation is completed, the processing ends. When the similarity evaluation is not completed, the processing of S1500 to S1503 is executed for the next abnormal case. In the present embodiment, an evaluation result of the production situation similarity shown in FIG. 9 is calculated by the above processing.

Finally, returning to the processing flow of FIG. 1, the display control unit 326 stores a time series operation time collection result, an abnormal/excellent case determination result, and a production situation similarity evaluation result stored in the memory unit 310 and information of each case item and case value of excellent or normal cases for abnormal cases used for the similarity evaluation to the time series operation time information 221, the abnormal/excellent case determination information 222, the production situation similarity evaluation information 223, and detailed production situation similarity information 224, respectively, and displays them on the input and output unit 100 (S150).

FIG. 17 is an explanatory diagram showing an example of a screen output by the work loss analysis system 10 according to the embodiment of the invention.

On an upper part of a screen 1700, an operation time breakdown 1701 for each facility and date based on the time series operation time information 221 of FIG. 7 is displayed. This is a graph in which values of total time are accumulated, in which the operation classification "net" is in a black portion, "incidental" is in a gray portion, and "waiting" is in a white portion. Accordingly, it is possible to grasp a date of abnormal state with a low net operation rate and a date of excellent state with a high net operation rate over time series, and it is possible to extract the facility and date of a work loss analysis target.

In addition, on the upper part of the screen, pulldowns 1702 and 1703 for selecting a facility and a display format are provided. It is possible to switch the facility that displays the graph and switch the display format from the accumulated operation time graph to an operation ratio of the total operation time of one day. Accordingly, it is possible to compare a difference in net/incidental/waiting time among facilities and a difference in operation situation on a ratio basis, and to specify the facility that should be dealt with, and cases in which incidents and waiting times for the entire work are remarkable.

Next, in the middle of the screen, an abnormal/excellent case list 1704 including abnormal, excellent, and normal states and the net operation rate at that time for each case (facility and date) based on the abnormal/excellent case determination information 222 of FIG. 8 is displayed. Accordingly, it is possible to prioritize the abnormal state that should be dealt with. Further, a similarity display button 1705 is displayed on the screen. By selecting one row from the abnormal/excellent case list 1704 and pressing the button, it is possible to output the similarity evaluation result related to the case. In the screen example of FIG. 17, the abnormal case of the facility "M01" and the date "6/3" is selected. The similarity evaluation result related to the case is acquired from the production situation similarity evaluation information 223 shown in FIG. 9, and is displayed as a production situation similarity list 1706 together with the net operation rate (acquired from FIG. 8) in each case. Accordingly, it is possible to analyze the work loss in order from cases with similar overall production situation among excellent cases (or normal cases) with high net operation rate, and it is possible to efficiently narrow down an analysis target even at a manufacturing site where high-mix low-volume production is performed.

Further, a detail display button 1707 is displayed on the screen. By selecting one row from the production situation similarity list 1706 and pressing the button, information of the detailed production situation similarity information 224 of FIG. 10 related to the case can be output to a similarity detail column 1708. Accordingly, it is possible to sort cases with high/low similarity for each production situation between the abnormal cases and the excellent cases (or normal cases). By confirming a comparison result of specific case items or case values, cause analysis of the work loss can be sequentially performed.

The following is a summary of several representative examples of the invention.

(1) An analysis system (for example, the work loss analysis system 10) includes a calculation unit (for example, the calculation unit 300), a storage unit (for example, the storage unit 200), and an input and output unit (for example, the input and output unit 100). The storage unit stores record information related to an operation time of an activity for producing a product (for example, products or components thereof) (for example, the production record information 211 and the detailed production record information 212), and threshold information for determining whether the activity of producing the product is abnormal based on the operation time (for example, a threshold for determining the abnormality in the abnormality/excellence determination threshold information 213). The calculation unit determines the operation time and non-operation time for each case extracted from the record information (for example, S110), determines abnormality for each case based on the operation time and the threshold information for each case (for example, S120), and outputs information of comparing the operation time of a case determined to be abnormal with the operation time of a case not determined to be abnormal to the input and output unit (for example, outputs a determination result in S150).

Accordingly, for example, even in a factory that produces high-mix low-volume products, it is possible to efficiently extract a cause of occurrence of work loss by extracting a production record in an abnormal state where an operation rate is low and an excellent state where the operation rate is high for a certain period, and comparing a difference in operation states of workers and facilities, products and components and facilities, and the like related to production during the period. As a result, it is possible to preferentially consider a work improvement measure for a point where the difference in the operation state is large, and it is possible to support improvement activities aimed at improving facility operation rate and increasing throughput.

(2) Here, for each case extracted from the record information, the calculation unit may determine time of an activity that adds value to the product (for example, net operation time) as the operation time and the other time as the non-operation time.

Accordingly, it is possible to extract the abnormal state in which the operation rate in a certain period is low.

(3) The operation time may include time to process the product. The non-operation time may include at least one of time of setup work for processing the product, time of confirmation work for confirming a processing result of the product, waiting time for waiting for the product, and stop time due to an abnormality of a facility for processing the product. The threshold information may include a ratio of the operation time to a total of the operation time and the non-operation time (for example, the net operation rate corresponding to classification "abnormal" in the abnormality/excellence determination threshold information 213 shown in FIG. 5) as a first threshold. The calculation unit may determine that a case is abnormal when the ratio of the operation time to the total of the operation time and the non-operation time in the case is lower than the first threshold.

Accordingly, it is possible to extract the abnormal state in which the operation rate in a certain period is low.

(4) Further, the threshold information may include a ratio higher than the ratio of the first threshold (for example, the net operation rate corresponding to the classification "excellent" in the abnormality/excellence determination threshold information 213 shown in FIG. 5) as a second threshold for determining whether the activity for producing the product is excellent based on the operation time. The calculation unit may determine that a case is excellent when the ratio of the operation time to the total of the operation time and the non-operation time in the case is higher than the second threshold.

Accordingly, it is possible to extract an excellent state that is compared with the abnormal state in which the operation rate is low in a certain period.

(5) The calculation unit may calculate a similarity between a case to be analyzed (for example, "original case") and a reference case to be compared with the case to be analyzed based on the record information (for example, S130 and S140), and may output information indicating the calculated similarity to the input and output unit (for example, the evaluation result of the similarity is output in S150).

Accordingly, for example, by searching for a case similar to the case determined to be abnormal but determined to be not abnormal, and comparing the case with the case determined to be abnormal, it is easy to consider improvement of the case determined to be abnormal.

(6) The record information may include at least one of information of identifying a person who performs the activity for producing the product (for example, the worker ID 303), information of identifying a facility used in the activity for producing the product (for example, the facility 304), information of identifying the product (for example, the product 305), and information of identifying an operation situation of the person and the facility in the activity of producing the product (for example, the operation situation 402). Then, the calculation unit may calculate at least one of a similarity of the person, a similarity of the facility, a similarity of the product, and a similarity of the operation situation between the case to be analyzed and the reference case.

Accordingly, it is possible to appropriately calculate the similarity between cases.

(7) The storage unit may store information indicating a weight of each of the similarity of the person, the similarity of the facility, the similarity of the product, and the similarity of the operation situation (for example, the similarity evaluation coefficient information 214). Then, the calculation unit may calculate an overall similarity by weighting and synthesizing at least one of the similarity of the person, the similarity of the facility, the similarity of the product, and the similarity of the operation situation (for example, Formula 1 to 3), and output information for outputting a plurality of reference cases in descending order of the overall similarity (for example, outputting the production situation similarity list in FIG. 17) to the input and output unit.

Accordingly, it is possible to appropriately calculate the overall similarity between the cases and display the result.

(8) Further, the information of identifying the operation situation may be information of identifying at least one of a situation in which the processing of the product is being performed (for example, "processing"), a situation in which setup work is being performed to process the product (for example, "setup"), a situation in which confirmation work is being performed to confirm a processing result of the product (for example, "confirmation"), a situation of waiting for the product (for example, "non-operation" and "waiting"), and a situation in which the activity is stopped due to an abnormality of the facility (for example, "abnormal stop").

Accordingly, it is possible to appropriately calculate the net operation rate based on the determination of abnormality.

(9) Further, the case to be analyzed may be a case determined to be abnormal based on the threshold information, and the reference case may be one or more cases not determined to be abnormal based on the threshold information.

Accordingly, it is easy to compare case determined to be not abnormal with the case determined to be abnormal, and to consider improvement of the case determined to be abnormal.

(10) The calculation unit may extract, as one case, information related to an activity performed using one facility for a predetermined period (for example, one day as shown in FIG. 7 or one shift time).

Accordingly, it is possible to appropriately extract the case to be analyzed.

The invention is not limited to the embodiment described above, and includes various modifications. For example, the embodiment described above is described in detail for better understanding of the invention. The invention is not necessarily limited to the embodiment including all configurations described above.

Configurations, functions, processing units, processing methods and the like described above may be partially or entirely implemented by hardware such as through design using an integrated circuit. The configurations, functions, and the like may also be implemented by software by means of interpreting and executing a program, by a processor, for implementing their respective functions. Information such as a program, a table, or a file for implementing each function can be stored in a storage device such as a non-volatile semiconductor memory, a Hard Disk Drive, and a solid state drive (SSD), or a computer readable non-transitory data storage medium such as an IC card, an SD card, and a DVD.

Control lines and information lines show those considered to be necessary for description, and not all of the control lines and the information lines are necessarily shown on the product. In practice, it may be considered that almost all of the configurations are connected to each other.

REFERENCE SIGN LIST 10 work loss analysis system
100 input and output unit
200 storage unit
210 input information
220 output information
300 calculation unit
310 memory unit
320 calculation processing unit

The invention claimed is:

1. An analysis system comprising:
a calculation unit;
a storage unit; and
an input and output unit, wherein
the storage unit stores record information related to operation time of an activity for producing a product, and threshold information for determining whether the activity for producing the product is abnormal based on the operation time,
the calculation unit is configured to
extract combinations of a facility and a period of time from the record information and generate a case having a case ID for each of the combinations,
determine the operation time and non-operation time for each generated case, wherein the calculation unit determines, for each generated case, time of an activity that adds value to the product as the operation time and other time as the non-operation time,
determine abnormality for each case based on the operation time for each case and the threshold information, and
output information of comparing the operation time of a case determined to be abnormal with the operation time of a case not determined to be abnormal to the input and output unit,
wherein the calculation unit calculates a similarity between a case to be analyzed and a reference case to be compared with the case to be analyzed based on the record information, and outputs information indicating the calculated similarity to the input and output unit.

2. The analysis system according to claim 1, wherein
the operation time includes time to process the product,
the non-operation time includes at least one of time of setup work for processing the product, time of confirmation work for confirming a processing result of the product, waiting time for waiting for the product, and stop time due to an abnormality of a facility for processing the product,
the threshold information includes a previously set ratio of the operation time to a total of the operation time and the non-operation time as a first threshold for each facility, respectively, and
the calculation unit determines that a case is abnormal when the ratio of the operation time to the total of the operation time and the non-operation time in the case is lower than the first threshold for the facility related to the case.

3. The analysis system according to claim 2, wherein
the threshold information includes a ratio higher than the ratio of the first threshold as a second threshold for determining whether the activity for producing the product is excellent based on the operation time, and
the calculation unit determines that a case is excellent when the ratio of the operation time to the total of the operation time and the non-operation time in the case is higher than the second threshold.

4. The analysis system according to claim 1, wherein
the record information includes at least one of information of identifying a person who performs the activity for producing the product, information of identifying a facility used in the activity for producing the product, information of identifying the product, and information of identifying an operation situation of the person and the facility in the activity for producing the product, and
the calculation unit calculates at least one of a similarity of the person, a similarity of the facility, a similarity of the product, and a similarity of the operation situation between the case to be analyzed and the reference case.

5. The analysis system according to claim 4, wherein
the storage unit stores information indicating a weight of each of the similarity of the person, the similarity of the facility, the similarity of the product, and the similarity of the operation situation,
the calculation unit calculates an overall similarity by weighting and synthesizing at least one of the similarity of the person, the similarity of the facility, the similarity of the product, and the similarity of the operation situation, and
the calculation unit outputs information for outputting a plurality of reference cases in descending order of the overall similarity to the input and output unit.

6. The analysis system according to claim 4, wherein
the information of identifying the operation situation is information of identifying at least one of a situation in which the processing of the product is being performed, a situation in which setup work is being performed to process the product, a situation in which confirmation work is being performed to confirm a processing result of the product, a situation of waiting for the product, and a situation in which the activity is stopped due to an abnormality of the facility.

7. The analysis system according to claim 1, wherein
the case to be analyzed is a case determined to be abnormal based on the threshold information, and
the reference case is one or more cases not determined to be abnormal based on the threshold information.

8. The analysis system according to claim 1, wherein
the calculation unit may extract, as one case, information related to an activity performed using one facility for a predetermined period.

9. An analysis method executed by an analysis system including a calculation unit, a storage unit, and an input and output unit, wherein
the storage unit stores record information related to operation time of an activity for producing a product, and threshold information for determining whether the activity for producing the product is abnormal based on the operation time, the analysis method comprising:
- a procedure in which the calculation unit extracts combinations of a facility and a period of time from the record information and generates a case having a case ID for each of the combinations;
- a procedure in which the calculation unit determines the operation time and non-operation time for each generated case, wherein the calculation unit determines, for each generated case, time of an activity that adds value to the product as the operation time and other time as the non-operation time;
- a procedure in which the calculation unit determines abnormality for each case based on the operation time for each case and the threshold information; and
- a procedure in which the calculation unit outputs information of comparing the operation time of a case determined to be abnormal with the operation time of a case not determined to be abnormal to the input and output unit, wherein the calculation unit calculates a similarity between a case to be analyzed and a reference case to be compared with the case to be analyzed based on the record information, and outputs information indicating the calculated similarity to the input and output unit.

* * * * *